Oct. 6, 1959  J. W. SAMMONS  2,907,506
FISHING POLE CARRIER FOR AUTOMOBILES
Filed Aug. 16, 1957
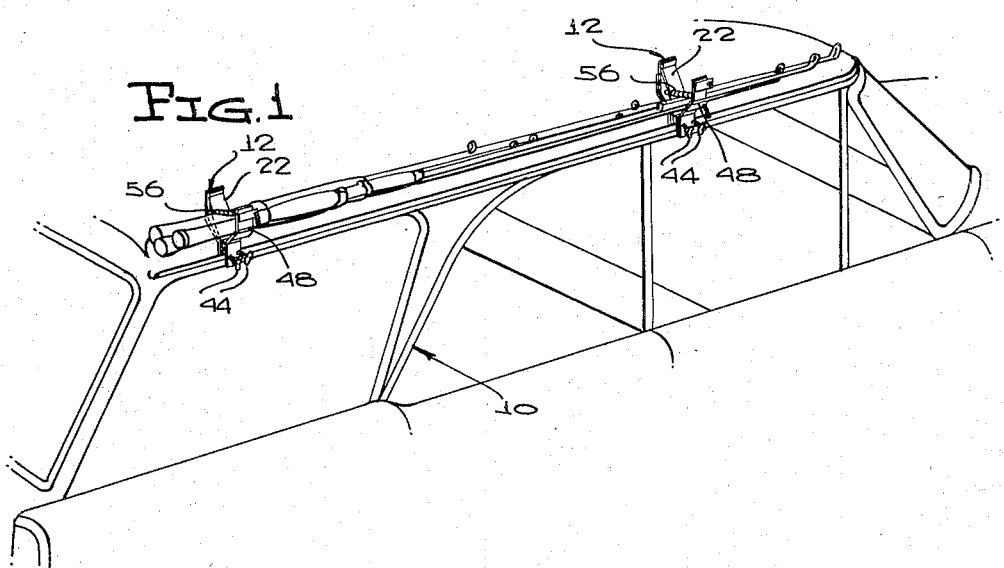
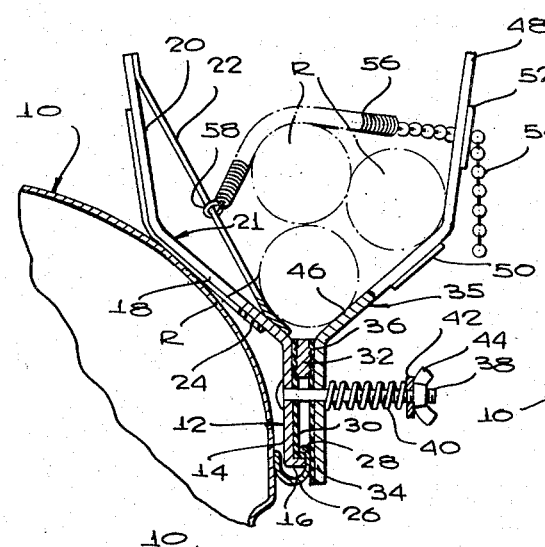
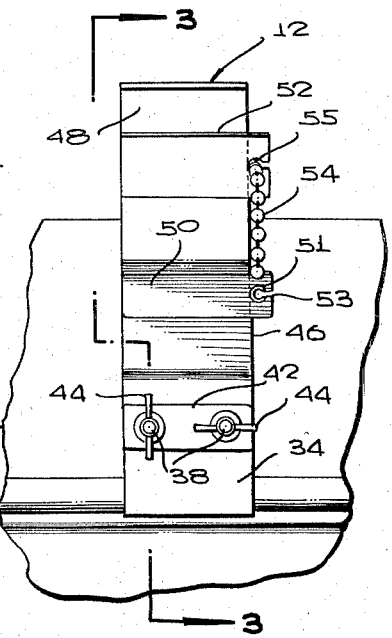
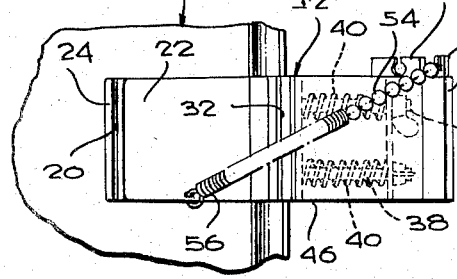
INVENTOR.
JAMES W. SAMMONS
BY
McMorrow, Berman + Davidson
ATTORNEYS

United States Patent Office 2,907,506
Patented Oct. 6, 1959

2,907,506

FISHING POLE CARRIER FOR AUTOMOBILES

James W. Sammons, Savannah, Ga.

Application August 16, 1957, Serial No. 678,477

1 Claim. (Cl. 224—42.1)

This invention relates to fishing pole carriers, and more particularly has reference to a carrier of the type adapted to be mounted upon an automobile, to support one or more fishing poles in position extending in a fore-and-aft direction upon the roof of the vehicle.

The main object of the present invention is to provide a generally improved fishing pole carrier, characterized by the pronounced ease with which the same can be applied to or removed from the vehicle body.

Another object is to permit application of the device to the vehicle body without the requirement of any special tools.

Another object is to insure against marring of or other damage to the vehicle body.

Another object is to utilize a handle means whereby the device is applied to or removed from a vehicle body, having the additional function of a pole-supporting cradle.

A further object is to insure that the poles will be firmly supported, in a manner to insure against their accidentally jarring loose from position.

Still another object is to adjustably tension the device in respect to the grip thereof upon the adjacent portion of the vehicle body.

Yet another object of importance is to permit the swift insertion or removal of one or more fishing poles, and the equally swift and easy engagement of the several poles in the associated cradles, through the use of a means which adapts itself to the number and cross-sectional shape of the supported poles.

Other objects will appear from the following description, the claim appended thereto, and from the annexed drawing, in which like reference characters designate like parts throughout the several views, and wherein:

Figure 1 is a fragmentary perspective view of a vehicle, equipped with fishing pole carriers according to the invention, a plurality of poles being supported on the carriers;

Figure 2 is an enlarged front elevational view of one of the carriers;

Figure 3 is a sectional view on line 3—3 of Figure 2, with the poles in position; and Figure 4 is a top plan view of the carrier.

Referring to the drawing in detail, a conventional vehicle 10 is illustrated, while at 12 there have been generally designated the fishing pole carriers constituting the present invention. A plurality of the carriers would be used, spaced longitudinally of the vehicle body to provide cradles receiving the poles at locations spaced longitudinally of the poles. Since all the carriers used are identical, the description of one will suffice for all.

Carrier 12 includes a straight, wide, flat first clamp member 14 having a lower end formed with a laterally outwardly projecting, narrow clamping lip 16. At its upper end, the first clamp 14 is integral with an obtusely angular handle having inner and outer end portions 18, 20 disposed at a wide obtuse angle relative to one another, with portion 18 being at an obtuse angle to the clamp 14.

There is thus provided an inner carrier element generally designated by the reference numeral 21, formed from a single piece of wide, flat bar stock shaped in such a way that the upper and lower portions 20, 14, respectively, thereof are extended approximately vertically, and are horizontally offset from the other, with said portions being connected by an inclined portion 18 oblique to the length both of the outer portion 20 and the inner portion 14.

The handle 18, 20 opens laterally outwardly of the vehicle body, providing the inner side of a cradle. Reinforcing the handle is a brace member 22 fixedly connected between the lower end of portion 18 and the upper end of portion 20.

To protect the surface of the vehicle roof, there is provided a thin rubber pad 24 cemented to the outer surface of the handle, so as to engage the surface of the vehicle roof as shown in Figure 3.

The vehicle, as is usual, has a drip strip or flange 26, of U-shaped, upwardly opening cross-section having the usual laterally inwardly directed bead 28 extending along its outer longitudinal edge to cooperate with lip 16 in hooking the carrier element 21 in position. A thin, sheet rubber liner 30 is secured to the outwardly directed face of the first clamp 14, extending between the hook 28 and lip 16 to protect the drip flange. Secured to the upper end of the liner 30 is a spacer block 32, spacing from the inner clamp 14, an outer clamp 34 which, in the use position of the parts, extends substantially parallel to the inner clamp as previously shown in Figure 3.

The outer clamp 34 constitutes the lower end portion of an outer carrier element generally designated at 35. Clamp 34 is disposed exteriorly of the drip strip 16, and secured to the inner face of the clamp 34 is a sheet rubber liner 36 which engages against the outer surface of the drip strip in the applied position of the device.

Connecting the clamps 14, 34 to each other for relative pivotal movement is a pair of bolts 38. These, as shown in Figures 2 and 4, are extended in parallel relation, being spaced transversely of the clamp 34 intermediate the opposite ends of said clamp. The heads of the bolts engage against the inner face of the clamp 14, with the bolts extending through openings of the clamp 14 and through registering openings of the clamp 34. The openings of clamp 34 may be slightly oversize, to permit a rocking movement of the clamps relative to one another, on the spacer block or fulcrum 32.

Circumposed about the outwardly projecting shanks of the bolts are compression, coil springs 40 abutting at their inner ends against clamp 34 and at their outer ends against an abutment plate 42 having spaced openings receiving the bolts, with wing nuts 44 being applied to the bolts and bearing against the plate 42. The tension of the springs is adjusted, to correspondingly adjust the strength of the grip of the clamp element upon the flange 26, responsive to threading of the wing nuts 44 toward or away from the clamp elements.

Integral with the upper end of the outer clamp 34 is a handle of obtusely angular form including an inner portion 46 disposed at a wide obtuse angle to a portion 48, the handle of the outer carrier element diverging in an upward direction from the handle of the inner element, providing an approximately U-shaped cradle adapted to receive one or more fishing rods R.

Welded or otherwise fixedly secured to the outer surface of inner handle portion 46 is a transverse plate 50 one end of which projects beyond one side of portion 46 (see Figure 2) and is formed with a small circular opening 51, to which access is had through a restricted throat or entranceway 53 opening upon the adjacent extremity of plate 50. Similarly secured to portion 48 is a plate 52, having a similar opening and entrance passage 55, A beaded chain 54 is connected at one end to a contractile, elongated, coil spring 56, hooked at 58 to brace 22. Spring 56 constitutes a resiliently contractile flexible element, which can be tensioned over the several rods, after which the chain 54 is engaged in the opening 55.

If only one rod is being carried, the chain can be engaged in the opening 51. Or, to assure that the chain will be locked, the chain could be engaged in the opening of one of the plates 50 or 52, and then extended through the opening of the other one of said plates.

In use, the rods can be readily inserted or removed, and are swiftly engaged in their cradles, without possibility of being lost, by tensioning of spring 56 over the supported rod and by releasable locking of said spring in position through the use of the beaded chain and locking plates 50, 52.

The insertion or removal of the rods is accomplished, first, without disturbing the mounting of the device upon the vehicle body. However, if it is desired to remove the carrier from the vehicle body, one merely presses the upper, divergent ends of the handles toward each other. The clamps pivot on block 32, being guided in their movements by the guide bolts 38, with the clamps 14 and 34 being spread apart against the restraint of spring 40 to permit the device to be detached from the drip strip. In this connection, when the device is in use, its grip upon the drip strip will be sufficient to hold the same in upright position. However, to insure against any tendency whatever on the part of the device to pivot laterally outwardly from the vehicle body when mounted upon the drip strip, a cord or any other expedient of a similar nature could be connected to the carrier element 21 and extended across the roof of the vehicle to the opposite side thereof and attached, should one so desire. This still would not interfere with the swift application or removal of the device.

With further regard to the adaptability of the device for removal responsive to shifting of the upper ends of the handles toward each other, it will be observed that this characteristic of the device permits one to remove the two carriers from the automobile without first removing the fishing poles from their cradles.

In other words, assuming that the fishing poles are in the Figure 1 position, and that one has returned home from a fishing trip, it is not necessary that the poles be individually removed, so as to be carried to and disposed in a storage space. Instead, one merely shifts the handles of each carrier toward each other. This detaches the carriers from the drip strip. Then, the carriers, together with the poles cradled therein, are bodily transported to the storage space which might, for example, be along the wall of one's garage, basement, attic, etc. In said storage space, one could obviously maintain shelf means, brackets, or the like, designed to be clampably engaged by the lower end portions of the first and second carrier elements. The result is that on arrival at the storage space, one merely spreads the lower end portions of the respective carriers, to permit them to receive the suitable support means, such as a pair of angle brackets, provided at the storage space. On release of the handles, the carriers will grip the support means at the storage space, and the poles will thus be horizontally supported, within the carriers, awaiting the next use thereof. On the occasion of the next fishing trip, one merely detaches the carriers from the brackets provided at the storage space, and once again attaches the brackets to the automobile drip strip, responsive to operation of the handles in the manner described above.

This arrangement is of value, for one who makes frequent fishing trips. By reason of the arrangement illustrated and described, one is enabled to eliminate the tedious, time-consuming operation of attaching or detaching clamps, by rotation of clamping screws or similar means. One is further enabled to eliminate the individual removal of the poles from the carriers, and still further, one is permitted to dispense with separate support hooks or brackets for the various poles, which support hooks are usually provided upon the wall of one's garage, basement, etc., for retaining the poles in horizontal positions when they are not in use.

It is believed apparent that the invention is not necessarily confined to the specific use or uses thereof described above, since it may be utilized for any purpose to which it may be suited. Nor is the invention to be necessarily limited to the specific construction illustrated and described, said construction only being intended to be illustrative of the principles of operation and the means for carrying out said principles, it being considered that the invention comprehends any minor change in construction that may be permitted within the scope of the appended claim.

What is claimed as new is as follows:

A quickly attachable and detachable fishing pole carrier for mounting upon a drip strip affixed to and curving transversely upwardly and outwardly from an automobile top to cooperate therewith in defining a gutter, comprising: confronting inner and outer carrier elements having generally vertical lower end portions, said portion of the inner carrier element terminating in a laterally projecting clamping lip extendible within said gutter in engagement with the inner surface of the strip, said portion of the outer carrier element extending perpendicularly to said lip for engagement with the outer surface of the strip, said elements having upper end portions constituting handles integrally connected to the respective lower end portions and diverging upwardly from the lower end portions to define a pole cradle having an upwardly opening, pole-receiving space progressively widened in an upward direction and proportioned to permit free movement of the upper extremities of the handles toward each other by a user, one of said elements including a spacer block secured to the lower end portion thereof in close proximity to the juncture of its lower end portion and handle, said block bearing against the lower end portion of the other carrier element to provide a fulcrum on which, responsive to shifting of the handles toward each other, the elements are rockable relative to each other to move the lower ends of the lower end portions away from each other out of engagement with the strip, the intermediate parts of the lower end portions having aligned openings; at least one elongated connector means loosely received in said openings and having a headed end abutting one of said lower end portions with its other end projecting outwardly from the other lower end portion; abutment means provided on said other end of the connector means; a spring interposed between the abutment means and the other lower end portion, said spring being stressed to bias the lower end portions toward each other into clamping engagement with the drip strip and to resiliently, yieldably oppose movement of the handles toward each other; and an extensible holddown means for the cradled poles, connected to one of said handles and separably engageable with the other handle in position bridging said cradle.

References Cited in the file of this patent

UNITED STATES PATENTS

| | | |
|---|---|---|
| 1,552,535 | Beerstecher | Sept. 8, 1925 |
| 2,176,709 | Dym | Oct. 17, 1939 |
| 2,355,836 | Willey | Aug. 15, 1944 |
| 2,514,266 | Walslager | July 4, 1950 |
| 2,529,285 | Felton | Nov. 7, 1950 |
| 2,561,523 | Lux | July 24, 1951 |
| 2,682,982 | Fischer | July 6, 1954 |
| 2,718,370 | Carrier | Sept. 20, 1955 |